(12) United States Patent
Mary et al.

(10) Patent No.: US 12,063,151 B2
(45) Date of Patent: Aug. 13, 2024

(54) METHODS AND DEVICES FOR OPERATION OF A NETWORK DATA ANALYTICS FUNCTION

(71) Applicant: Huawei Technologies Co., Ltd., Shenzhen (CN)

(72) Inventors: Sheeba Backia Mary, Kista (SE); Andrey Krendzel, Kista (SE); Ali Hamidian, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 17/549,505

(22) Filed: Dec. 13, 2021

(65) Prior Publication Data

US 2022/0103443 A1 Mar. 31, 2022

Related U.S. Application Data

(63) Continuation of application No. PCT/EP2019/065775, filed on Jun. 14, 2019.

(51) Int. Cl.
*H04L 43/04* (2022.01)
*H04L 43/00* (2022.01)
(Continued)

(52) U.S. Cl.
CPC ............ *H04L 43/04* (2013.01); *H04L 43/028* (2013.01); *H04L 43/0876* (2013.01); *H04L 43/14* (2013.01); *H04W 24/08* (2013.01)

(58) Field of Classification Search
CPC ... H04L 43/04; H04L 43/028; H04L 43/0876; H04L 43/14; H04L 41/40; H04L 43/16; H04L 41/14; H04L 43/20; H04W 24/08
(Continued)

(56) References Cited

U.S. PATENT DOCUMENTS

| 2017/0078157 A1 | 3/2017 | Zhang |
| 2018/0262924 A1 | 9/2018 | Dao et al. |

(Continued)

FOREIGN PATENT DOCUMENTS

| CN | 108028780 A | 5/2018 |
| CN | 109548178 A | 3/2019 |
| WO | 2019032968 A1 | 2/2019 |

OTHER PUBLICATIONS

"3rd Generation Partnership Project; Technical Specification Group Services and System Aspects; Architecture enhancements for 5G System (5GS) to support network data analytics services (Release 16)," 3GPP TS 23.288 V16.0.0, pp. 1-52, 3rd Generation Partnership Project, Valbonne, France (Jun. 2019).

(Continued)

*Primary Examiner* — Don N Vo
(74) *Attorney, Agent, or Firm* — Leydig, Voit & Mayer, Ltd.

(57) ABSTRACT

A mobile network data analytics function node is described. The network data analytics function node obtains from a network function service consumer, a request for analytics of at least one load parameter for at least one network function service provider and obtains a load data from at least one network function service provider. The network data analytics function node performs filtering of the load data from the network function service provider to filter out load data responsive to said at least one load parameter, to determine the requested analytics of said at least one load parameter based on the filtered load data from the network function service provider, and provides, to the network function service consumer, the determined analytics of at least one load parameter for said at least one network function provider. The reporting message overhead and resource exhaustion can be reduced.

18 Claims, 8 Drawing Sheets

(51) Int. Cl.
*H04L 43/028* (2022.01)
*H04L 43/0876* (2022.01)
*H04W 24/08* (2009.01)

(58) Field of Classification Search
USPC ........................................................ 455/423
See application file for complete search history.

(56) References Cited

U.S. PATENT DOCUMENTS

2020/0228420 A1* 7/2020 Dao .................... H04L 43/08
2021/0083956 A1* 3/2021 Fan .................. H04L 43/0876

OTHER PUBLICATIONS

"Network Performance Analytics," 3GPP TSG-SA WG2 Meeting #133, S2-1905261, USA, Reno, Total 5 pages, 3rd Generation Partnership Project, Valbonne, France (May 13-17, 2019).

"3rd Generation Partnership Project; Technical Specification Group Services and System Aspects; Policy and Charging Control Framework for the 5G System; Stage 2 (Release 15)," 3GPP TS 23.503 V15.0.0, pp. 1-56, 3rd Generation Partnership Project, Valbonne, France (Dec. 2017).

"NF Load Analytics," 3GPP TSG-SA WG2 Meeting #133, S2-1904969, USA, Total 6 pages, 3rd Generation Partnership Project, Valbonne, France (May 13-17, 2019).

"NF Load Analytics," 3GPP TSG-SA WG2 Meeting #133, S2-1906154 (revision of S2-1906069), Total 5 pages, 3rd Generation Partnership Project, Valbonne, France (May 13-17, 2019).

"3rd Generation Partnership Project; Technical Specification Group Services and System Aspects; System Architecture for the 5G System; Stage 2 (Release 16)," 3GPP TS 23.501 V16.1.0, pp. 1-368, 3rd Generation Partnership Project, Valbonne, France (Jun. 2019).

"3rd Generation Partnership Project; Technical Specification Group Services and System Aspects; Procedures for the 5G System; Stage 2 (Release 16)," 3GPP TS 23.502 V16.1.1, pp. 1-495, 3rd Generation Partnership Project, Valbonne, France (Jun. 2019).

"3rd Generation Partnership Project; Technical Specification Group Services and System Aspects; Management and orchestration; 5G performance measurements (Release 16)," 3GPP TS 28.552 V16.2.0, pp. 1-98, 3rd Generation Partnership Project, Valbonne, France (Jun. 2019).

"3rd Generation Partnership Project; Technical Specification Group Services and System Aspects; Management and orchestration; 5G end to end Key Performance Indicators (KPI) (Release 16)," 3GPP TS 28.554 V16.1.0, pp. 1-20, 3rd Generation Partnership Project, Valbonne, France (Jun. 2019).

"3rd Generation Partnership Project; Technical Specification Group Core Network and Terminals; 5G System; Network Function Repository Services; Stage 3 (Release 16)," 3GPP TS 29.510 V16.0.0, pp. 1-135, 3rd Generation Partnership Project, Valbonne, France (Jun. 2019).

* cited by examiner

METHODS AND DEVICES FOR OPERATION OF A NETWORK DATA ANALYTICS FUNCTION

CROSS-REFERENCE TO RELATED APPLICATIONS

This application is a continuation of International Application No. PCT/EP2019/065775, filed on Jun. 14, 2019, the disclosure of which is hereby incorporated by reference in its entirety.

TECHNICAL FIELD

The disclosure relates to a network function of a telecommunication network. In particular the disclosure relates to the operation of a network data analytics function (NWDAF) of a telecommunications system.

BACKGROUND

The NWDAF is part of the architecture specified in 3GPP Technical Specification(s) (TS) TS 23.501, TS 23.288 and uses the mechanisms and interfaces specified for the 5G Core Network (5GC) and operation, administration and management (OAM). The NWDAF interacts with different entities for different purposes. This includes: data collection based on event subscription, provided by an access and mobility management function (AMF), a session mManagement function (SMF), a policy control function (PCF), a network repository function (NRF), a unified data management (UDM), an application function (AF) (directly or via a network exposure function (NEF)), and OAM; retrieval of information from data repositories (e.g., a unified data repository (UDR) via a UDM for subscriber-related information); retrieval of information about Network Functions (NFs) (e.g., a network repository function (NRF) for NF-related information, and a network slice selection function (NSSF) for slice-related information); and on demand provision of analytics to consumers.

A single instance or multiple instances of NWDAF may be deployed in a public land mobile network (PLMN). In case multiple NWDAF instances are deployed, the architecture supports deploying the NWDAF as a central NF, as a collection of distributed NFs, or as a combination of both.

When multiple NWDAFs exist, not all need to be able to provide the same type of analytics results, i.e., some of them can be specialized in providing certain types of analytics. An analytics ID information element is used to identify the type of supported analytics that NWDAF can generate. Also, NWDAF instance(s) can be collocated with a 5GS NF.

The NWDAF defined in 3GPP TS 23.501 and TS 23.288 provides analytics services to 5GC NFs, AFs, and OAM.

Analytics are either statistical information of the past, and/or predictive information of the future.

An NWDAF may be used for analytics for one or more Network Slice.

Different NWDAF instances may be present in the 5GC, with possible specializations per categories of analytics. The capabilities of a NWDAF instance are described in the NWDAF profile stored in the NRF.

In order to support NFs that are consumers of analytics with the discovery of a NWDAF instance that is able to provide some specific type of analytics, each NWDAF instance should provide the list of analytics ID(s) that it supports when registering to the NRF, in addition to other NRF registration elements of the NF profile. Other NFs requiring the discovery of an NWDAF instance that provides support for some specific type of analytics may query the NRF and include the Analytics ID(s) that identifies the desired type of analytics for that purpose.

5GC network functions and OAM decide how to use the data analytics provided by the NWDAF to improve the network performance.

The NWDAF utilizes the existing service-based interfaces to communicate with other 5GC network functions and OAM.

The NWDAF may expose the result of the data analytics to any consumer NF utilizing a service-based interface.

The interactions between NF(s) and the NWDAF take place within a PLMN.

The NWDAF typically has no knowledge about NF application logic. The NWDAF may use subscription data but only for statistical purpose.

The operation of the NWDAF is described in 3GPP TS 23.288, and contributions S2-1904969 and S2-1905261. These documents describe the operation of the NWDAF for NF load analytics and also for NF performance analytics.

There is a constant desire to improve on existing technology within the telecommunication industry and to improve the working of telecommunications system such as the 5G system.

Hence there is need for an improved operation of the NWDAF in telecommunications networks.

SUMMARY

There is a need for an improved operation of the NWDAF.

It is therefore an object of the disclosure to provide an improved operation of the NWDAF in telecommunications networks.

This object and or other objects are obtained by device and method and computer program as set out in the appended claims.

In accordance with a first aspect of the disclosure, a network data analytics function configured for operation in a mobile telecommunications network is provided. The network data analytics function is configured to obtain from a network function service consumer, a request for analytics of at least one load parameter for at least one network function service provider and to obtain a load data from at least one network function service provider. The network data analytics function is configured to perform filtering of said load data from the network function service provider to filter out load data responsive to said at least one load parameter, to determine the requested analytics of said at least one load parameter based on the filtered load data from the network function service provider, and to provide to the network function service consumer the determined analytics of at least one load parameter for said at least one network function provider. Hereby, the reporting message overhead and resource exhaustion due to dynamic NF load (or UE number/population/resource usage change in an Area of Interest) change notification from OAM, NRF and NWDAF can be reduced.

In accordance with a first implementation of the first aspect, the network data analytics function can be configured to determine the requested analytics of said at least one load parameter as the filtered-out load data. Hereby no additional processing is required to determine the analytics responsive to the request from the network function service consumer.

In accordance with a second implementation of the first aspect, the network data analytics function can be configured to perform the filtering of said network function provider load data by obtaining only load data for said at least one network function provider corresponding to said at least one load parameter. Hereby only load data responsive to the requested load parameter needs to be obtained by the network data analytics function thereby reducing the signaling load.

In accordance with a third implementation of the first aspect, the network data analytics function can be configured to update analytics of said at least one load parameter based on an obtained change of network performance information, and provide updated reports of analytics of said at least one load parameter to the network function service consumer when a threshold for said at least one load parameter is reached. Hereby updated load data can be provided to the network function service consumer.

In accordance with a fourth implementation of the first aspect, the at least one load parameter is at least one of a desired load level and/or a critical load level or a preconfigured load level. Hereby the network function service consumer can be provided with suitable analytics. Alternatively, or additionally the load parameter is a load range, such as a resource usage, a number of user equipment (UEs), a number of protocol data sessions (PDU sessions), or a number of handovers. The NWDAF can also be configured to provide the NF performance analytics periodically in addition to the desired or critical threshold-based notifications if requested by the network function service consumer in the analytics subscribe/request.

The disclosure also extends to a method and computer program supporting the aspect set out above.

In accordance with a second aspect of the disclosure, a network data analytics function configured for operation in a mobile telecommunications network is provided. The network data analytics function is configured to obtain from a network function service consumer a request for analytics of network function (NF), load for at least one NF and or at least one NF Set, a critical reporting threshold for NF load information, wherein the Analytics Filter Information is set to at least one of: network function and instance specific information, NF Service Set ID(s), NF Set ID(s) (if not included in the Target of analytics reporting information), and user equipment (UE) specific information, The network data analytics function is configured to provide NF load analytics responsive to said request for NF load based on either a NF set ID(s) and/or NF service set ID(s) and/or UE internal group identification information, and to send the NF load analytics to the network function consumer.

Hereby the network data analytics function can provide more accurate/finer service level granularity of information specific to the NF set and/or NF service set and/or UE internal group-based NF load analytics. Also, the NF consumer (load analytics information) can be prevented from taking any decision or initiate any process based on any obsolete NF load analytics information as an expiry time/ validity period is included along with the NF load analytics information provided to the network function consumer.

In accordance with a first implementation of the second aspect, the network data analytics function is configured to send NF load analytics together with UE or UE internal group specific load NF information.

In accordance with a second implementation of the second aspect, the network data analytics function is configured to send NF load analytics together with a validity period or time of expiry of the NF load analytics.

In accordance with a third implementation of the second aspect, the network data analytics function is configured to retrieve the NF load and NF resource usage from a network repository function (NRF), and an operation, administration and management (OAM) for each NFs or each NF instance belonging to a NF Set denoted by an NF Set ID or belonging to a NF Service Set denoted by an NF Service Set ID.

In accordance with a fourth implementation of the second aspect, the network data analytics function is configured to provide updated reports of NF load analytics with new analytics, and to send the updated reports of NF load analytics to the network function service consumer either periodically or when a reporting/critical threshold for a load level is reached. The updated reports of NF load analytics can be sent together with a validity period or time of expiry of the updated reports of NF load analytics.

BRIEF DESCRIPTION OF THE DRAWINGS

The disclosure will now be described in more detail, by way of example, and with reference to the accompanying drawings, in which.

DETAILED DESCRIPTION

Figure 1:
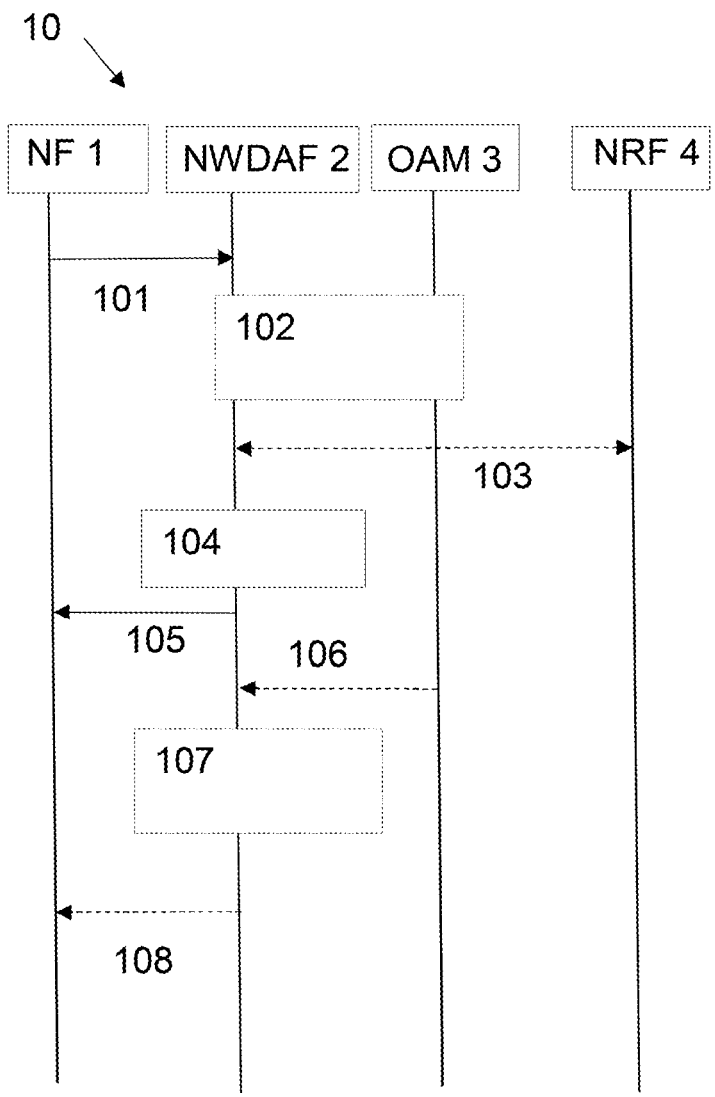
FIG. 1 shows a signaling diagram according to a first implementation.

The disclosure will now be described in detail hereinafter with reference to the accompanying drawings, in which certain illustrative examples of the invention are shown. The disclosure may, however, be embodied in many different forms and should not be construed as limited to the illustrative examples set forth herein; rather, these illustrative examples are provided by way of example so that this disclosure will be thorough and complete, and will fully convey the scope of the disclosure to those skilled in the art. Like numbers refer to like elements throughout the description.

"NF Set" and "NF Service Set" definitions from TS 23.501, "Clause 5.21.3.2 NF Set and NF Service Set" and "Clause 3.1 definitions" are used in the following description.

NF Service Set: a group of interchangeable NF service instances of the same service type within an NF instance. The NF service instances in the same NF Service Set have access to the same context data.

NF Set: a group of interchangeable NF instances of the same type, supporting the same services and the same network slice(s). The NF instances in the same NF Set may be geographically distributed but have access to the same context data. The actual mapping of instances to a given Set is configurable and can be set in deployment.

As has been realized in existing NF load analytics the NWDAF typically does not provide sufficient information to the NF consumers for planning the ongoing/future service request. Also, even though an "Observation period" indicates the time when the statistics or predictions are requested, there is no means for the NF Consumer or the NWDAF to identify the period for which the NF load analytics can be relied upon. It can also be the case that the NWDAF use the UE(s) and its related group information to select the NF instance serving the UE(s) but the NWDAF lacks UE(group) level finer NF load analytics information which can lead to inefficient decisions at the NF load analytics Consumer in case of specific UE group service related NF overload.

As has further been realized in existing NF Performance Analytics, the following can occur. A change of network performance information, i.e. change in the load in the area of interest at the observed period, is detected by OAM, or a change in the NF load information is reported by a network repository function (NRF), and is notified to the NWDAF. The network performance information which is defined as change in the load in the area of interest (AOI) or number of UEs located in an AOI or a NF service instance resource usage in an AOI is a dynamic measure. Thus, if the OAM detects any change in load of an AOI or if the NRF reports the NF load change to the NWDAF for every change, and if the NWDAF performs an analytics notification to the network function analytics consumer for every change, then certainly this can become an overhead for the OAM and NRF, and can end up in resource exhaustion.

To address the problem that NF load analytics do not provide sufficient information to the NF consumers for planning the ongoing/future service request, the NWDAF or source NF can be configured to provide the information on NF load specific to the NF Service Set(s) by using NF Service Set ID(s) in the filter information corresponding to the NF instance(s) or NF service instances(s) with in the NS Service Set. The NWDAF or the source NF (NF analytics producer) can provide the NF Set specific NF load using NF Set ID(s) if provided by the NF service analytics consumer as the target of analytics or analytics filter in the analytics subscribe or request message.

To address the problem that even though an "observation period" indicates the time when the statistics or predictions are requested, there is no way for the NF Consumer or the NWDAF to identify the period for which the NF load analytics can be relied upon, the NWDAF or the Source NF can provide the expiry time/validity time along with the NF load analytics information provided to the NF load analytics consumers to prevent any decision making based on obsolete analytics information.

To address the problem that the NWDAF use the UE(s) and its related group information to select the NF instance serving the UE(s) but the NWDAF lacks UE(group) level finer NF load analytics information which can lead to inefficient decisions at the NF load analytics consumer in case of specific UE group service related NF overload, the UE internal group ID(s) can be used in the analytic filter information by the NF load analytic consumer while requesting to the NWDAF or Source NF to get the UE group service specific NF load information which notifies about the normal and abnormal resource allocation to the specific UE group(s).

To address the problem that the network performance information that is defined as a change in the resource usage or load in the area of interest (AOI) or number of UEs located in an AOI is a dynamic measure, so if the OAM detects any change in load of an AOI or if NRF reports the NF load change to the NWDAF for every change that can become an overhead for the OAM and NRF and will end up in resource exhaustion, thresholds/load parameters can be used. In addition the network performance analytics information can also be periodically provided by the NWDAF to the network function analytics consumer if the consumer request such periodic notification during the analytics subscription or request. For example, analytics notification period, load range and threshold for analytics notification specific analytics filter information to limit the NF performance analytic information and corresponding notification accordingly to prevent the notification overhead can be used. Also, desired/target load level Indicator/Information can be set to any value such as "null" or a range from "0 to maximum load level" (operator specific values) that a NWDAF is requested to notify in the result of the analytics to the consumer. It can be an analytics consumer desired value. Also, critical/reporting load level indicator/information can be set to a threshold which triggers the OAM and NRF to report the change in the load in an AOI with respect to Number of UE(s) accordingly. The load can be defined as number of UEs or UE groups or NF resource engaged or any 5G network processing (e.g. PDU session processing, handover etc.) in an AOI. Also, the "load and performance information" collected by the NWDAF and "network performance statistics and predictions" provided by the NWDAF can consider the "Desired load level" requested by the analytics consumer for analytics provision. Similarly, the NWDAF can consider the analytics consumer requested "critical load level" for NF performance analytics notification.

The critical load level is the value that is a maximum NF load level beyond which the system performance is considered to be adversely affected or when a NF analytics consumer needs to do any relevant operations, in which case the NWDAF needs to notify the NF analytics consumer if a NF load goes above or below a critical load level. The critical load helps to address the current overhead of constant NF load change notification by the OAM/NRF and NWDAF. Further to address the similar problem, in addition to the proposed critical load level, a periodic interval can also be sent by the NF performance analytics consumer to the NWDAF in the analytics subscribe/request message. Then a NWDAF in addition to the notification based on the critical load level, it can also notify the NF analytics consumer about the NF performance analytics information periodically.

In addition, a desired load level can be defined. The desired load level is a load level sent by the analytics consumer to the NWDAF for the NWDAF to consider providing only NF performance or load analytics information meeting the "desired load level" criteria in the response message. Currently, the NWDAF provides a huge set of NF performance analytics (both significant and insignificant data). In this case the NF analytics consumer sends the interested "desired load level" to the NWDAF to get only a significant NF performance related data from the NWDAF. The desired load level can contain any number of NF load ranges that need to considered by the NWDAF for providing the NF performance analytics information to the NF consumer in the analytics response message.

As an alternative/supplement a pre-determined load level can be defined. The pre-determined load level is a variant of the above load levels, which can be configured by the operator in the NF analytics consumer to support this analytics procedure.

In accordance with a first aspect the NWDAF can provide a finer granular service specific NF load analytics, in the form of statistics or predictions or both, to another NF.

The service consumer may be an NF, an AF, or the OAM.

The consumer of these analytics can indicate in the request: analytics ID set to "NF load information"; the target of analytics reporting set to any one or combination of the following values/information including: NF ID or NF Set ID(s), NF Service Set ID(s), UE ID and/or UE Internal group ID(s); analytics filter information such as: NF Set ID(s), NF Service Set ID(s) and an optional list of instance IDs and/or UE Internal group ID(s), notification interval (or notification period), where the NF Set ID(s) and NF Service Set ID(s) can be specified in analytics filter information if the same is not provided in the "target of analytics" IE; an observation period indicates the time when the statistics or predictions are requested; and in a subscription, the notification correlation ID and the notification target address are included.

The NWDAF can notify the result of the analytics to the consumer as indicated in the tables below.

Usage of Target of Analytics Reporting Information:

If the "Target of Analytics Reporting" contains NF ID, then analytics corresponding to the NF is provided/considered for analytics is provided by the NWDAF.

If the "Target of Analytics Reporting" contains NF Set ID(s), then the analytics corresponding to all the NFs or NF instances within the specific NF Set is provided/considered by the NWDAF. In accordance with some illustrative examples, if the "Target of Analytics Reporting" contains NF Set ID(s), then the analytics corresponding to a group of interchangeable NF instances of the same type, supporting the same services and the same Network Slice(s) are provided/considered by the NWDAF.

If the "Target of Analytics Reporting" contains NF Service Set ID(s), then the analytics corresponding to all the group of interchangeable NF service instances of the same service type within an NF instance are considered for analytics provision by the NWDAF.

If the "Target of Analytics Reporting" contains UE ID and/or UE Internal group ID(s) then NFs and NF instance(s) serving the specific UE or group of UEs are determined and the UE internal group specific NF load analytics are provided/considered for analytics provision by the NWDAF.

Usage of Analytics Filter Information:

If the NF Instance IDs, and/or UE Internal group ID(s) are provided, then the NF load analytics specific to the resources assigned for the group of UE(s) for a service is provided by the NWDAF.

If only UE Internal group ID(s) are provided, then the NF serving the UE are determined using the Target of Analytics Reporting Information and the NF load assigned for the UE internal group in the determined NF instance is provided as an analytics by the NWDAF.

If the NF Set ID(s) are provided, then the analytics corresponding to all the NFs or NF instances or NF service instances within the specific NF Set is provided/considered by the NWDAF. In accordance with some illustrative examples, if the "Target of Analytics Reporting" contains NF Set ID(s), then the analytics corresponding to a group of interchangeable NF instances of the same type, supporting the same services and the same Network Slice(s) are provided/considered by the NWDAF.

If the NF Service Set ID(s) (If it is not specified in the "Target of Analytics" IE) are provided, the NWDAF shall provide the analytics for each designated NF service instance belonging to a NF Service Set(s). If the UE Internal group ID(s) is included in the filter information, then the analytics of NF load assigned for the specific internal UE group in the corresponding NF instance belonging to the NF Service Set are provided as an analytics by the NWDAF. In such case the NF information in the Target of Analytics Reporting should be ignored. Otherwise, if NF information is not sufficiently provided in the request, the NWDAF shall use the specific UE ID provided either in the "Target of Analytics Reporting" or "Analytics Filter Information" to determine which instances (AMF, N3IWF, SMF, PCF) are serving this specific UE and corresponding NF load analytics are provided by the NWDAF accordingly.

The list of possible instances can be limited to AMF, N3IWF, SMF, and PCF.

Input data is described below.

For the purpose of NF load analytics, the NWDAF can collect the information as listed in Table A-1 or Table A-2. Table A-1 ad Table A-2 illustrate different illustrative examples.

TABLE A-1

(per NF Instance) Data collected by NWDAF for NF load analytics

| Information | Source | Description |
| --- | --- | --- |
| NF resource status per instance | OAM | The status of assigned resources such as CPU and memory for a specific NF instance |
| NF load per instance | OAM or NRF | The load of a specific NF instance |
| NF resource status per NF Set ID/NF Service Set ID | OAM or NRF | The status of assigned resources such as CPU and memory specific to NFs/NF service instance in a NF Set/NF service instances in a NF Service Set along with the its identifier(s) |
| No load per NF Set ID/NF Service Set ID | OAM or NRF | The load of a specific NFs/NF Service instance in a NF Set/NF service instance of a NF Service Set along with its identifier(s) |
| NF resource status per UE internal Group ID(s) | OAM or NRF | The status of assigned resources such as CPU and memory specific to the UE Internal Group with in a NF or NF instance or NF service instance |
| NF load per UE internal Group ID(s) | OAM or NRF | The load of a specific NF/NF instance/NF service instance assigned for a specific UE internal Group(s) |

TABLE A-2

| (per NF) Data collected by NWDAF for NF load analytics | | |
| --- | --- | --- |
| Information | Source | Description |
| NF load | NRF | The load of a specific NF(s) belonging to a NF Set (or) the load of NF instance(s) (or) the load of NF instance(s) belonging to a NF service Set in the NF profile as defined per TS.29.510 |
| NF status | NRF | The status of a specific NF instance belonging to a NF Service Set (or) the status of specific NF(s) belonging to a NF Set as defined per TS 29.510 |
| NF resource usage | OAM | The usage of assigned virtual resources currently in use for a specific NF instance (or) for an internal UE group in a NF instance (mean usage of virtual CPU, memory, disk) as defined per TS 28.552 clause 5.7 |

The NWDAF can collect the NF/NF instance level resource/load information from any NF (Source) in the 5G system if the load information is available. The source NF is not restricted to NRF and OAM.

Output analytics are described below

The NWDAF services as defined in the TS 23.288 clause 7.2 and 7.3 can be used to expose the analytics.

The proposed load statistics information can be defined per NF service instance or per NF as shown in the following Table A-3 and Table A-4 accordingly.

The NF load can be evaluated based on any kind of resource being assigned/requested such as memory, CPU, disk, PDU sessions, handovers, any procedure/process that is taken care by a 5G Core network function or gNB.

TABLE A-3

| (per NF instance) NF load analytics statistics | |
| --- | --- |
| Information | Description |
| List of resource status (1 . . . n) | List of load information for each NF instance within a NF Service Set (identified by a NF Service Set ID) |
| > Instance ID/NF Service Instance ID | Identification of the NF instance/NF Service Instance |
| > NF Instance status | The availability status of the NF Instance(s)/availability status of NF service instance in a NF service set on the Observation period, expressed as a percentage of time |
| > NF Service Set Status | The availability status of the NFs within a NF service Set on the Observation period, expressed as a percentage of time |
| > NF Instance resource status/usage | The status of assigned and/or available resources such as CPU and memory specific to the NF instances/NF Service Instances in a NF Service Set or for a UE internal group |
| > NF Instance load | The average load of the NF instance/NF service instance belonging to a NF Service Set or NF instance load specific to the internal UE group over the observation period |
| > NF Instance peak load (optional) | The maximum load of the NF instance/NF service instance belonging to a NF Service Set or NF load specific to the internal UE group over the observation period |
| > Expiry Time/Validity Time/Validity Period | Time for which the analytics can be relied upon for taking any decision at the network load analytics consumer. |

TABLE A-4

| (per NF) NF load analytics statistics | |
| --- | --- |
| Information | Description |
| List of resource status (1 . . . n) | List of load information for each NFs within a NF Set (identified NF Set ID) |
| > NF ID | Identification of the NF within a NF Service Set/NF Set |
| > NF status | The availability status of the NF in a NF Set on the Observation period, expressed as a percentage of time |
| > NF Set Status | The availability status of the NF Set on the Observation period, expressed as a percentage of time |
| > NF resource status/usage | The status of assigned and/or available resources such as CPU and memory specific to the NF in a NF Set or for a UE internal group |
| > NF load | The average load of the NF belonging to a NF Set or NF load specific to the internal UE group over the observation period |
| > NF peak load (optional) | The maximum load of the NF belonging to a NF Set or NF load specific to the internal UE group over the observation period |
| > Expiry Time/Validity Time/Validity Period | Time for which the analytics can be relied upon for taking any decision at the network load analytics consumer. |

The proposed Load predictions information can be defined specific to per NF service instance or per NF as shown in the following Table A-5 and Table A-6 accordingly.

TABLE A-5

NF load analytics predictions (per NF Instance)

| Information | Description |
| --- | --- |
| List of resource status (1 ... n) | List of predicted load information for each NF instance/NF Service instance belonging to a NF Service Set |
| > Instance ID | Identification of the NF instance/NF Service instance |
| > NF Instance status | The availability status of the NF Instance/NF Service Instance on the Observation period, expressed as a percentage of time |
| > NF Service Set Status | The availability status of the NF Instances within a NF service Set on the Observation period, expressed as a percentage of time |
| > NF Instance resource usage | The average usage of assigned resources (CPU, memory, disk) per NF Instances with in a NF Service Set |
| > NF Instance load | The average load of the NF instance over the observation period with in a NF Service Set/due to any internal UE group |
| > NF Instance peak load (optional) | The maximum load of the NF instance/NF Service Instance over the observation period in a NF Service Set or engaged by any UE internal group |
| > Confidence | Confidence of this prediction |
| > Expiry Time/Validity Time/Validity Period | Time for which the analytics can be relied upon for taking any decision at the network load analytics consumer. |

TABLE A-6

NF load analytics predictions (per NF Instance)

| Information | Description |
| --- | --- |
| List of resource status (1 ... n) | List of predicted load information for each NF belonging to a NF Set (identified by the NF Set ID) |
| > Instance ID | Identification of the NFs within a NF Set |
| > NF status | The availability status of the NFs with in a NF Set on the Observation period, expressed as a percentage of time |
| > NF Set Status | The availability status of the NFs within a NF Set on the Observation period, expressed as a percentage of time |
| > NF resource usage | The average usage of assigned resources (CPU, memory, disk) per NFs with in a NF Set |
| > NF load | The average load of the NFs over the observation period with in a NF Set/due to any internal UE group |
| > NF peak load (optional) | The maximum load of the NF over the observation period in a NF Set or engaged by any UE internal group |
| > Confidence | Confidence of this prediction |
| > Expiry Time/Validity Time | Time for which the analytics can be relied upon for taking any decision at the network load analytics consumer. |

In FIG. 1 a signaling diagram for a consumer NF to request analytics to NWDAF for NF load of various NF instances or NF service instances in accordance with the above is shown. FIG. 1 shows a telecommunications network 10 comprising a consumer network function (NF) 1 and a NWDAF 2. The telecommunications network 10 also comprises an OAM 3 and a network repository function (NRF) 4.

First, during 101, the NF 1 sends a request to the NWDAF 2 for analytics for NF load for a specific NF or NF Set(s), using either the Nnwdaf_AnalyticsInfo or Nnwdaf_AnalyticsSubscription service. The analytics ID is set to NF load information, the target for analytics is set to NF id or NF Set ID(s). The analytics filter information is set to network specific information such as NF Instance ID(s) or NF Set ID(s) or/and NF Service Set ID(s) and/or user equipment (UE) specific information such as UE ID(s) or UE group ID(s). Based on the requirement the analytics filter information can contain a combination of NF and UE specific information listed above. The NF can request statistics or predictions or both and can provide a time window for the time of concern for the statics/predictions. The NF can also request the analytics with a notification time interval/notification period.

Next, during a procedure 102, if the request is authorized, and in order to provide the requested analytics, the NWDAF may need for each NF targeted instance/service instance to subscribe to OAM services to retrieve the target NF load information and the target NF resource status following the operations described in TS 23.288 Clause 6.2.3.2 for data collection from OAM 3. The procedure 102 can in some cases be excluded e.g. when the NWDAF 2 already has the requested analytics. It should be noted that for simplicity the signalling diagram only shows a subscription/notification model. However, both request-response and subscription-notification models can be supported.

Next, during 103, the NWDAF 2 can retrieve the NF load from NRF 4 using Nnrf_NFManagement_NFStatusSubscribe service operation for each NF instance/NF service instance belonging to a NF Set denoted by the NF Set ID. Typically either procedure 102 or 103 is performed.

Next, during 104, the NWDAF 2 derives requested analytics based on either the NF Set ID(s) or NF Service Set ID(s) and/or UE internal group information.

Then, during 105, the NWDAF provide requested NF load analytics along with the NF Set ID/NF Service Set ID and UE internal group ID if provided as "target of analytics" and its expiry time to the NF, using either the Nnwdaf_AnalyticsInfo_Response or Nnwdaf_AnalyticsSubscription_Subscribe response, depending on the service used during 101.

Then, if during 101 the NF has subscribed to receive continuous reporting of NF load analytics specific to the "target of analytics" and "analytics filter information", the NWDAF upon reception of notification of new NF load information from OAM during 106, can generate new analytics during 107 with expiry time and provide them to the NF 1 during 108. In accordance with one example, the expiry time set by the NWDAF/Source NF specified can be defined as "validity time" or "validity period" of the NF load analytics information. In accordance with some illustrative examples, the notification from the OAM can be periodic or load threshold driven. In this case the notification specific NF load threshold can be specified in the analytics request message during 101 by the NF analytics consumer to the NWDAF 2.

The above procedure supports providing more accurate/finer service level granularity of information specific to the NF Set and/or NF Service Set and/or UE internal group-based NF load analytics by the NWDAF. Also, the NF consumer (load analytics information) can be prevented from taking any decision or initiate any process based on any obsolete NF load analytics information as an expiry time/validation time is included along with the NF load analytics information provided to the analytics consumer. Further the NWDAF can provide periodic notifications on the NF load analytics information if requested by the NF analytics consumers during the analytics subscriptions/request.

Figure 2:
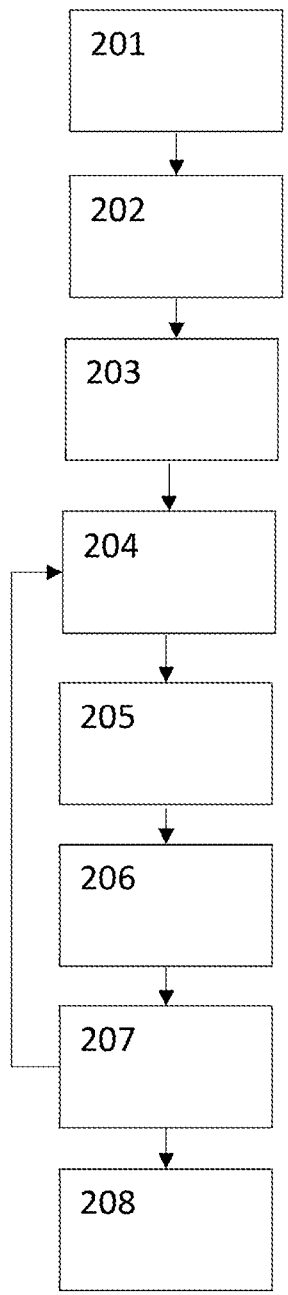
FIG. 2 is a flow chart illustrating operations performed by an NWDAF in a signaling procedure in accordance with FIG. 1.

FIG. 2 shows a flow diagram illustrating operations performed by the NWDAF 2 in an example where the signalling in FIG. 1 is performed. First, during 201, a request for analytics is obtained from a network function, NF, service consumer. This can be an Analytics Info_Request/Subscribe request (type of analytics=NF load information, target of analytics=NF id/NF Set ID, Analytic Filter Information=Instance ID(s)/UE Internal Group ID(s)/NF Service Set ID(s)/NF Set D(s) or any of the combination listed. Then, during 202, data collection from OAM can be performed. The collection can follow the procedures described in TS 23.288 Clause 6.2.3.2 for data collection from OAM. Next, during 203, the NWDAF can retrieve the NF load from NRF for each NF instance belonging to a NF Set by providing the NF Set ID. Next, during 204, the NWDAF derives requested analytics by filtering collected data to match the filters set in the request obtained during 201. The filtered data can be determined to be the analytics responsive to the request. Next, during 205, requested analytics are provided to the NF service consumer along with the NF id/NF Set ID(s), NF load information and the expiry time for the analytics. The NWDAF can then, during 206, obtain from the OAM new NF load analytics data. This can be performed by receiving a notification from the OAM where the OAM Notifies NWDAF when OAM has a new NF load analytics information specific to the "target of analytics" and "analytics filter information". The notification can be periodic or load threshold driven.

Next, during 207, the NWDAF generates new analytics. The new analytics can be based on the notification received during 206. The NWDAF can then, during 208, send new analytics to the NF service consumer. The new analytics can be sent in a notification as a new analytics notification along with NF id/NF Set ID(s), NF load information and the expiry time for the analytics).

Figure 5:
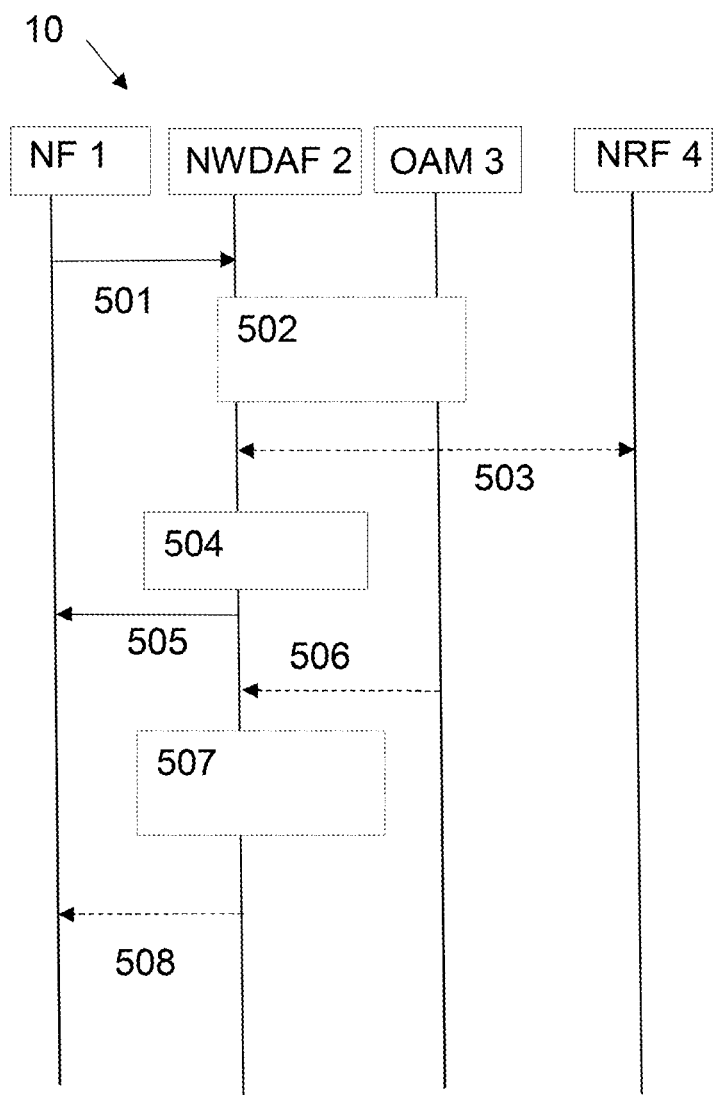
FIG. 5 shows a signaling diagram according to a variant of the first implementation.

FIG. 5 shows a signaling diagram for a consumer NF to request analytics to NWDAF for NF load of various NF instances in accordance with the above according to an alternative illustrative example. The NF load analytics request from the analytics consumer to the NWDAF, and the input and output remains the same as for the example of FIG. 1. Only the information sent in 503 by the NWDAF to the Source NF to collect analytics related information is different from the information sent during 103 of the illustrative example of FIG. 1.

Thus, in FIG. 5, operations 501-502 correspond to 101-102, and operations 504-508 correspond to 104-108. During 503, the NWDAF retrieves the NF load from NRF using Nnrf_NFManagement_NFStatusSubscribe service operation for each NF. The NWDAF may retrieve the NF load from NRF based on the NF ID and instance ID(s)/UE ID(s)/UE Internal Group ID(s)/NF Service Set ID(s)/NF Set ID(s) or a combination of these parameters.

Figure 6:
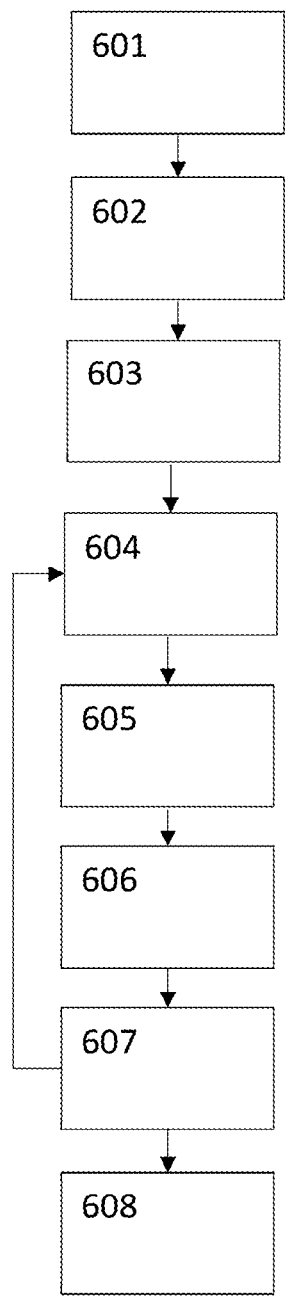
FIG. 6 is a flow chart illustrating operations performed by an NWDAF in a signaling procedure in accordance with FIG. 5.

In FIG. 6 a flow diagram illustrating operations performed by the NWDAF 2 in an example where the signalling in FIG. 5 is performed. 1. The operations performed in FIG. 6 are similar to the operations described in conjunction with FIG. 2. Thus operations 601-602 correspond to and can be performed in accordance with 201-202 described above. Further, during 603, the NWDAF is configured to retrieve the NF load from NRF using Nnrf_NFManagement_NFStatusSubscribe service operation for each NF. The NWDAF can thus retrieve the NF load from NRF based on the NF ID and Instance ID(s)/UE ID(s)/UE Internal Group ID(s)/NF Service Set ID(s)/NF Set ID(s) or a combination of these parameters. Operations 604-608 can be performed in accordance with operations 204-208 described above.

In accordance with a second aspect the NWDAF 2 can provide target specific NF performance analytics. Network performance analytics provides statistics and or predictions on the load in an AOI. In addition, statistics and or predictions on the number of UEs that are located in that AOI can be provided.

The consumer of these analytics can indicate in the request:

an analytics ID set to "Network Performance";

the AOI, where the load at the time indicated in the observation period is requested;

target reporting information containing either a UE, or an internal group identifier that refers to the group for which the analytics on the number of UEs that are located in the AOI at the time indicated in the observation period is requested. Otherwise the Target of Event Reporting can be set to "any UE";

Analytic Filter Information containing: optional maximum number of results, Target Load Level and Reporting Load Level, Area of Interest (list of TA or Cells) which restricts the area in focus (this can be mandatory if Target Of Event Reporting is set to any UE, optional otherwise), Notification Period;

Proposed additional Analytics Filter(s): Target Load Level, Reporting Load Level and Periodic Notification (Notification Time Period/Notification Time interval);

Desired/Target load level can be set to any value such as "null" or a range from "0 to maximum load level" (operator specific values) which a NWDAF is requested to notify in the result of the analytics to the consumer. It can be an Analytics consumer desired value;

statistics or prediction are requested. In a subscription, the Notification Correlation Id and the Notification Target Address can be included.

The NWDAF can notify the result of the analytics to the consumer as will now be described.

Input Data

The NWDAF collects Load and Performance information in an Area of Interest from the sources listed in Table B-1 and location information of each of the UEs within Target Of Event Reporting from the sources listed in Table B-2.

The tables below show the information provided to the NWDAF by the source NF. The source NF is not limited to the OAM and it can be any NF in the 5G system that contains the NF load and performance level information.

TABLE B-1

Load and Performance information collected by NWDAF

| Load and performance information | Source | Description |
| --- | --- | --- |
| Load and performance information based on the desired load level(s) | OAM | Statistics on load specific to the "Desired load level" and performance per CellId in the Area of Interest |
| > VR usage of NF (5G NF or NB) for the Desired load level | | Usage of assigned virtual resources currently in use for a specific NF instance (mean usage of virtual CPU, memory, disk) (TS 28.552 clause 5.7) |
| > Number of PDU Sessions requested to setup in the range of the Desired load level | | number of PDU Sessions in the PDU SESSION RESOURCE SETUP REQUESTS received by the gNB from AMF (TS 28.552 clause 5.1.1.5) |
| > Number of PDU Sessions successfully setup in the range of the Desired load level | | number of PDU Sessions successfully setup by the gNB for the PDU SESSION RESOURCE SETUP REQUESTS received from AMF. (TS 28.552 clause 5.1.1.5) |
| > Number of requested handover preparations in the range of the Desired load level | | number of handover preparations requested by the source gNB. |
| > Number of successful handover preparations in the range of the Desired load level | | number of successful handover preparations received by the source NR cell CU |
| > Number of requested handover resource allocations in the range of the Desired load level | | number of handover resource allocation requests received by the target NR cell CU |
| > Number of successful handover resource allocations in the range of the Desired load level | | number of successful handover resource allocations at the target NR cell CU for the handover |

TABLE B-2

Number of UEs in Area of Interest information collected by NWDAF

| Number of UEs information | Source | Description |
| --- | --- | --- |
| Number of UEs | AMF | Number of UEs in an Area of Interest per CellId which falls within the range of the "Desired load level" or "Desired UE numbers" |

Critical/Reporting Load Level can be set to a threshold which triggers the OAM and NRF to report the change in the load in an "Area of Interest" with respect to "Number of UE(s)" accordingly.

The load can be defined as number of UEs or UE groups or NF resource engaged or any 5G network processing (ex. PDU session processing, handover etc.) in an Area of interest. An Observation period indicates the time when the Output Analytics:

The NWDAF can be configured to provide both statistics and predictions on Network Performance which falls within the NF analytics consumers requested "Desired load level" for both resource and UE population. The "desired load level" restrictions helps to focus the analytics on really overloaded cell or tracking area which will have significant performance impacts and impacts at the NF analytics consumer decisions.

Network performance statistics can be defined as set out in Table B-3.

TABLE B-3

Network performance statistics

| Information | Description |
|---|---|
| List of performance information (1 . . . max) or Desired load level(s) | Observed statistics during the observation period for the "Desired load level" |
| > Area subset | TA or Cell ID within the requested area of interest |
| > gNB resource usage specific to the "Desired load level" | Usage of assigned resources (CPU, memory, disk) (average, peak) |
| > Number of UEs | Number of UEs observed in the area (TA or Cell) (average) which is in the range of the "Desired load level" |
| > Communication performance | Ratio of PDU successful set-up (average) |
| > Mobility performance | Ratio of successful hand-over (average) |

Network performance predictions can be defined as set out in the Table B-4.

TABLE B-4

Network performance predictions

| Information | Description |
|---|---|
| List of performance information (1 . . . max) or Desired load level(s) | Predicted analytics during the observation period |
| > Area subset | TA or Cell ID within the requested area |
| > gNB resource usage | Usage of assigned resources (CPU, memory, disk) (average, peak, in range with the "Desired load level") |
| > Number of UEs | Number of UEs predicted in the area per cell ID which is similar to the "Desired load level" |
| > Communication performance | Ratio of PDU successful set-up |
| > Mobility performance | Ratio of successful hand-over |
| > Confidence | Confidence of this prediction |

The number of results can be limited by the input parameter "maximum number of results"

Figure 3:
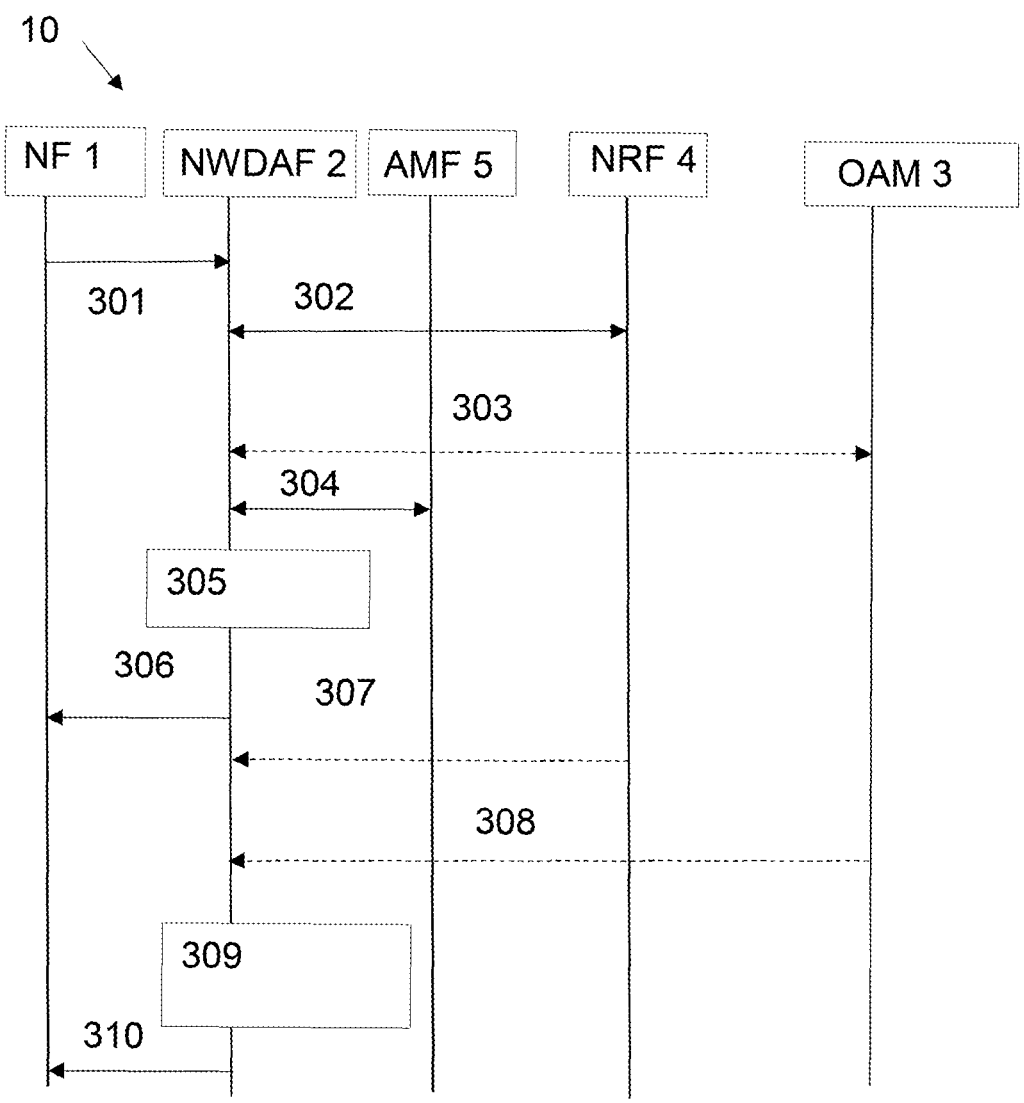
FIG. 3 shows a signaling diagram according to a second implementation.

In FIG. 3 a signaling diagram for a consumer NF to request subscription to network performance analytics is shown. FIG. 1 shows a telecommunications network 10 comprising a Consumer Network Function, NF, 1 and a NWDAF 2. The telecommunications network 10 also comprises an OAM 3, an Access and Mobility Management Function, AMF 5 and a Network Repository Function, NRF 4.

First, during 301, the NF 1 sends Nnwdaf_AnalyticsSubscription_Subscribe or Nnwdaf_AnalyticsInfo_Request (Analytics ID="Network Performance", AnalyticsFilter="Area of interest", "Desired Load Level(s)" and "Critical Load Level(s)" and Target Event Reporting, Observation Period(s), Notification Period) to the NWDAF 2.

Next, during 302, the NWDAF 2 discovers from NRF 4 the AMF(s) 5 belonging to the AMF Region(s) that include(s) the Area of Interest and subscribes to NF load information from NRF about these AMF(s) as stated in Table B-1.

Next, during 303, the NWDAF 2 subscribes to OAM 3 to collect the load performance information stated in Table B-1 on the Area of Interest. This can be performed following the procedure captured in TS 23.288 Clause 6.2.3.3.

Then, during 304, The NWDAF 2 collects the number of UEs located in the Area of Interest from AMF using Namf_EventExposure_Subscribe service, including the Target Event Reporting provided as an input parameter (i.e. any UE or Internal Group Identifier).

Next, during 305, the NWDAF 2 derives the requested analytics based on the NF analytics consumer provided "Desired Load Level(s)".

Then, during 306, the NWDAF 2 sends Nnwdaf_AnalyticsSubscription_Notify or Nnwdaf_AnalyticsInfo_Request response (one or more instances of Performance Information SubscriptionCorrelationId, indicated "Desired Load Level(s)", Probability of assertion).

When a change of network performance information when reaches the "Critical Load Level(s)" specified by the NF performance analytics consumer, e.g. change in the load in the area of interest when meets or exceeds the "Critical Load Level(s)" at the observed period, is detected by OAM 3 or NRF 4 this can be is notified to the NWDAF during 307 and 308.

Next, during 309, the NWDAF derives new analytics based on the most recent data collected specific to the "Critical Load Level(s)" as obtained during 307 and or 308.

Finally, during 310, the NWDAF 2 provides a notification to the NF 1 using Nnwdaf_AnalyticsSubscription_Notify (one or more instances of Performance Information) SubscriptionCorrelationId, indicated Critical Load Level(s), and Probability of assertion. In case of periodic notification, the NWDAF 2 provides a notification to the NF 1 using Nnwdaf_AnalyticsSubscription_Notify (one or more instances of Performance Information) SubscriptionCorrelationId, indicated Notification Period, and Probability of assertion.

Hereby, a NWDAF 2 configured for operation in a mobile telecommunications network 10 is provided that is configured to obtain from a network function service consumer NF 1, a request for analytics of at least one load parameter for at least one network function service provider, NRF,4 and to obtain a load data from at least one network function service provider, NRF 4. The NWDAF perform filtering of said load data from the network function service provider NRF 4 to filter out load data responsive to said at least one load parameter and determine the requested analytics of said at least one load parameter based on the filtered load data from the network function service provider NRF 4. The NWDAF 2 provide to the network function service consumer NF 1, the determined analytics of at least one load parameter for said at least one network function provider. The NWDAF can determine the requested analytics of said at least one load parameter as the filtered-out load data.

Further, the NWDAF can update analytics of said at least one load parameter based on an obtained change of network performance information, and provide updated reports of analytics of said at least one load parameter to the network function service consumer when a threshold for said at least one load parameter is reached.

The load parameter can be a desired load level and/or a critical load level or a pre-configured load level. In accordance with some illustrative examples the load parameter can be a load range such as a range of at least one of: a resource usage, a number of User Equipment, UEs, a number of Protocol Data sessions, PDU sessions, or a number of handovers. The notification can also be periodic if requested by the NF analytics consumer.

Figure 4:
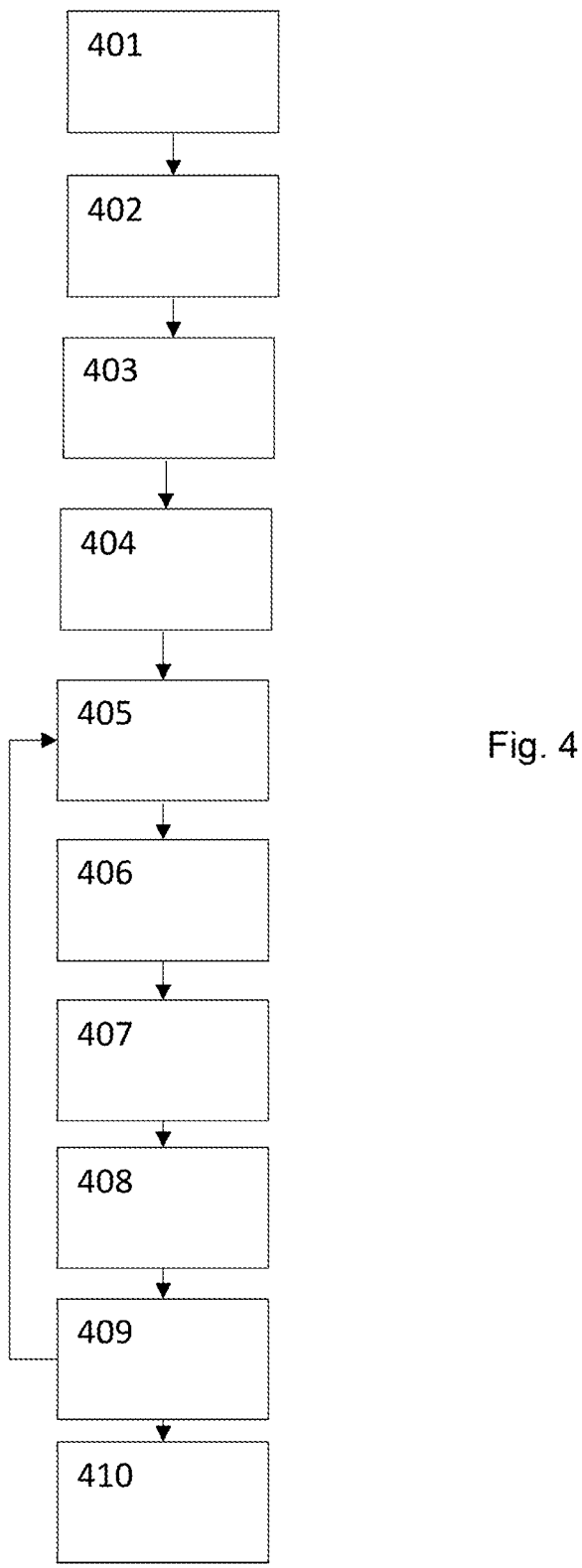
FIG. 4 is a flow chart illustrating operations performed by an NWDAF in a signaling procedure in accordance with FIG. 3.

FIG. 4 shows a flow diagram illustrating operations performed by the NWDAF 2 in an example where the signalling in FIG. 3 is performed. First, during 401, the NWDAF obtains from a network function service consumer, a request for analytics of one or more load parameters for one or more network function service providers. For example, the NF sends Nnwdaf_Analytics_Subscription_Subscribe or Nnwdaf_AnalyticsInfo_Request (Analytics ID="Network Performance", AnalyticsFilter="Area of interest", "Desired Load Level(s)" and "Critical Load Level(s)", Notification Period and Target Event Reporting, Observation Period(s)) to the NWDAF.

Next, during 402, the NWDAF will send the discovery request to NRF along with the AMF Region. The AMF region includes the area of interest and the NWDAF receives from the NRF the discovery response with AMFs in the AMF Region. Also, the subscribes for NF load information to NRF and NWDAF gets corresponding notifications from NRF as a response. Then, during 403, the NWDAF subscribes to OAM to get the load information on the Area of Interest. The can for example be performed following the procedure captured in TS 23.288 Clause 6.2.3.2.

Next, during 404, the NWDAF collects the number of UEs located in the Area of Interest from AMF using including the Target Event Reporting provided as an input parameter (i.e. any UE or Internal Group Identifier). The NWDAF then during 405 derives the requested analytics based on the NF analytics consumer provided "Desired Load Level(s)". The NWDAF then during 406 sends analytics information along with (one or more instances of Performance Information SubscriptionCorrelationId, indicated "Desired Load Level(s)", Probability of assertion). Next during 407 and 408, the NWDAF obtains a possible change in network performance. For example, a change of network performance information in the observed period can be detected by OAM and or NRF. This information can be notified to the NWDAF such that a notification from the OAM is received during 407 and a notification from the NRF is received during 408. Based on such obtained information during 407 and 408, the NWDAF derives new analytics based on the most recent data collected specific to the "Critical Load Level(s)", during 409. The NWDAF then during 410 provides a notification for the new performance analytics information with (one or more instances of Performance Information) SubscriptionCorrelationId, indicated Critical Load Level(s), and Probability of assertion.

Figure 7:
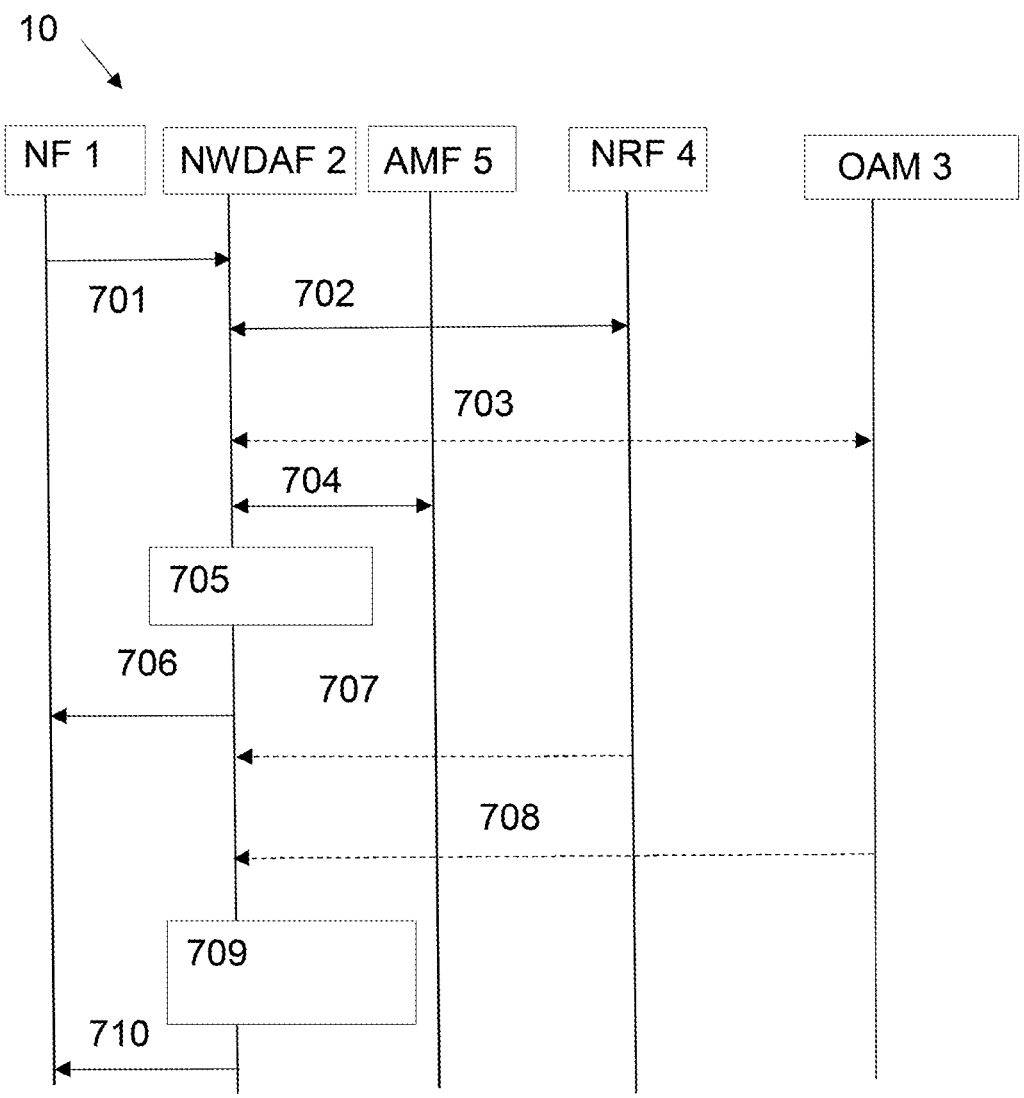
FIG. 7 shows a signaling diagram according to variant of the second implementation.

FIG. 7 shows a signaling diagram similar to the signaling diagram of FIG. 3. The signaling in FIG. 7 differs from the signaling in FIG. 3 in that the filtering of said network function provider load data by obtaining only load data for said at least one network function provider corresponding to said at least one load parameter. Thus, in the signaling in accordance with FIG. 7, operation 701 correspond to operation 301 of FIG. 3. During 702-704 the NWDAF 2 sends a request for only load data corresponding to the requested load parameter of operation 701 and only load data to the requested load parameter of operation 701 will be obtained by the NWDAF 2 in response to the requests. Operations 705 and 706 correspond to operations 305 and 306. When receiving notifications from OAM 3 or NRF 4 during 707 and 708 only notifications relating to the requested load parameter need to be notified. Operations 709 and 710 can correspond to 309 and 310 described above.

Figure 8:
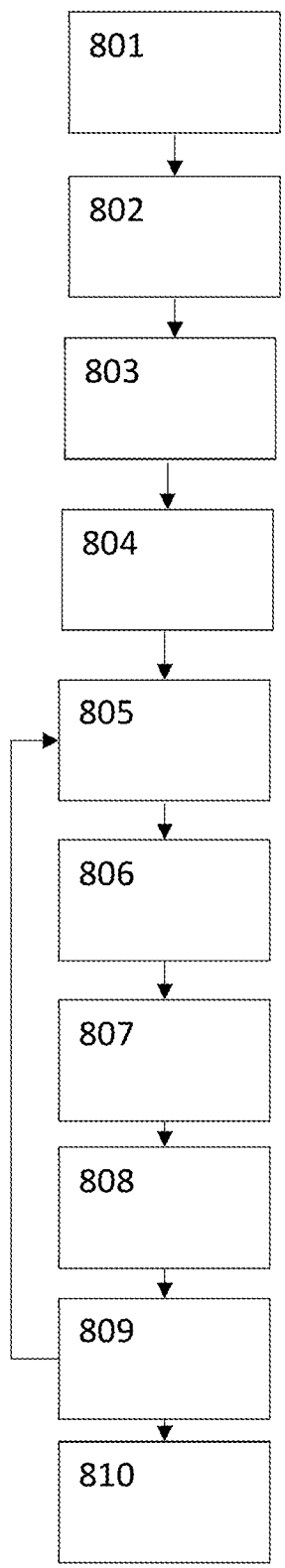
FIG. 8 is a flow chart illustrating operations performed by an NWDAF in a signaling procedure in accordance with FIG. 7.

FIG. 8 shows a flow diagram illustrating operations performed by the NWDAF 2 in an example where the signalling in FIG. 7 is performed. FIG. 8 is similar to FIG. 4. In the example illustrated in FIG. 8. Thus, during 801 corresponds to operation 401 of FIG. 4. Operation 802 corresponds to 402 of FIG. 4. During 803, the NWDAF subscribes to OAM with Desired Load Level, Critical Load Level to get the load information on the Area of Interest, but otherwise following the procedure captured in TS 23.288 Clause 6.2.3.2. During 804, the NWDAF collects the number of UEs located in the Area of Interest from AMF using including the Target Event Reporting provided as an input parameter (i.e. any UE or Internal Group Identifier) along with Desired Load Level, Critical Load Level. Hereby relevant data can be filtered out so that only data relevant for Desired load level and Critical Load level is obtained by the NWDAF thereby reducing the amount of data received by the NWDAF. The remaining operations 805-810 can be performed in accordance with 405-410 described above in conjunction with FIG. 4.

What is claimed is:
1. A network node comprising:
a processor, and
a non-transitory computer-readable medium including computer-executable instructions that, when executed by the processor, facilitate carrying out a network data analytics function operated in a mobile telecommunications network,
wherein the network data analytics function executes a method comprising:
  obtaining, from a network function service consumer, a request for an analytics of at least one load parameter for at least one network function service provider;
  obtaining a load data from at least one network function service provider;
  providing, by performing filtering of the load data to filter out load data responsive to the at least one load parameter, filtered load data;
  determining, based on the filtered load data, the analytics of at least one load parameter;
  providing, to the network function service consumer, the determined analytics of at least one load parameter for said at least one network function provider together with a related validity period or expiry time of the determined analytics;
  updating analytics of the at least one load parameter based on an obtained change of network performance information or notification time period; and
  providing updated reports of analytics of the at least one load parameter to the network function service consumer in accordance with events including both:
    in accordance with a threshold for the at least one load parameter being reached; and
    in accordance with a requested periodic notification time period expiring.

2. The network node of claim 1, wherein the method includes:
  determining the requested analytics of the at least one load parameter as the filtered-out load data.

3. The network node of claim 1, wherein the method includes:
  performing the filtering of the load data from the network functions service provider by obtaining only load data for the at least one network function provider corresponding to the at least one load parameter.

4. The network node of claim 1, wherein the at least one load parameter is at least one parameter taken from the group consisting of: a desired load level, a critical load level, and a pre-configured load level.

5. The network node of claim 1, wherein the at least one load parameter is a load range.

6. The network node according to claim 5, wherein the load range is a load range of at least one of the group consisting of: a resource usage, a number of user equipment, a number of protocol data sessions, and a number of handovers.

7. A method, carried out in a network data analytics function entity configured for operation in a mobile telecommunications network, the method comprising:
  obtaining, from a network function service consumer, a request for an analytics of at least one load parameter for at least one network function service provider;
  obtaining a load data from at least one network function service provider;
  providing, by performing filtering of the load data from the network function service provider to filter out load data responsive to said at least one load parameter, filtered load data;
  determining, based on the filtered load data, the analytics of at least one load parameter;
  providing, to the network function service consumer, the determined analytics of at least one load parameter for at least one network function provider together with a related validity period or expiry time of the determined analytics;
  updating analytics of the at least one load parameter based on an obtained change of network performance information or notification time period; and
  providing updated reports of analytics of the at least one load parameter to the network function service consumer in accordance with events including both:
    in accordance with a threshold for the at least one load parameter being reached; and
    in accordance with a requested periodic notification time period expiring.

8. The method according to claim 7, wherein the method includes:
  determining the requested analytics of said at least one load parameter as the filtered-out load data.

9. The method according to claim 7, wherein the method includes:
  performing the filtering of the load data from the network function service provider by obtaining only load data for said at least one network function provider corresponding to the at least one load parameter.

10. The method of claim 7, wherein the at least one load parameter is at least one parameter taken from the group consisting of: a desired load level, a critical load level, and a pre-configured load level.

11. The method of claim 7, wherein the at least one load parameter is a load range.

12. The method according to claim 11, wherein the load range is a load range of at least one of the group consisting of: a resource usage, a number of user equipment, a number of protocol data sessions, and a number of handovers.

13. A non-transitory computer-readable medium including computer-executable instructions that, when executed by a processor, cause a networked computer system to carry out a method comprising:
  obtaining, from a network function service consumer, a request for an analytics of at least one load parameter for at least one network function service provider;
  obtaining a load data from at least one network function service provider;
  providing, by performing filtering of the load data from the network function service provider to filter out load data responsive to said at least one load parameter, filtered load data;
  determining, based on the filtered load data, the analytics of at least one load parameter;
  providing, to the network function service consumer, the determined analytics of at least one load parameter for at least one network function provider together with a related validity period or expiry time of the determined analytics;
  updating analytics of the at least one load parameter based on an obtained change of network performance information or notification time period; and
  providing updated reports of analytics of the at least one load parameter to the network function service consumer in accordance with events including both:
    in accordance with a threshold for the at least one load parameter being reached; and
    in accordance with a requested periodic notification time period expiring.

14. The non-transitory computer-readable medium according to claim 13, wherein the method includes:
  determining the requested analytics of said at least one load parameter as the filtered-out load data.

15. The non-transitory computer-readable medium according to claim 13, wherein the method includes:
performing the filtering of the load data from the network function service provider by obtaining only load data for said at least one network function provider corresponding to the at least one load parameter.

16. The non-transitory computer-readable medium of claim 13, wherein the at least one load parameter is at least one parameter taken from the group consisting of: a desired load level, a critical load level, and a pre-configured load level.

17. The non-transitory computer-readable medium of claim 13, wherein the at least one load parameter is a load range.

18. The non-transitory computer-readable medium according to claim 17, wherein the load range is a load range of at least one of the group consisting of: a resource usage, a number of user equipment, a number of protocol data sessions, and a number of handovers.

* * * * *

UNITED STATES PATENT AND TRADEMARK OFFICE
CERTIFICATE OF CORRECTION

PATENT NO. : 12,063,151 B2  
APPLICATION NO. : 17/549505  
DATED : August 13, 2024  
INVENTOR(S) : Mary et al.

Page 1 of 1

It is certified that error appears in the above-identified patent and that said Letters Patent is hereby corrected as shown below:

In the Claims

Claim 1: Column 20, Line 65: reads as "a processor, and" should read as -- a processor; and --.

Signed and Sealed this  
Twenty-ninth Day of April, 2025

Coke Morgan Stewart  
*Acting Director of the United States Patent and Trademark Office*